United States Patent [19]

Smith et al.

(10) Patent No.: US 8,397,873 B2
(45) Date of Patent: Mar. 19, 2013

(54) ZONED ELEVATOR SYSTEM

(75) Inventors: Rory S. Smith, El Cajon, CA (US);
Randolph W. Huff, Hartsdale, NY (US);
Richard D. Peters, Great Kingshill
(GB); Bruce Powell, Canton, CT (US);
Gerhard Thumm, Filderstadt (DE)

(73) Assignee: Thyssen Elevator Capital Corp., El Cajon, CA (US)

( * ) Notice: Subject to any disclaimer, the term of this patent is extended or adjusted under 35 U.S.C. 154(b) by 0 days.

(21) Appl. No.: 13/332,540

(22) Filed: Dec. 21, 2011

(65) Prior Publication Data

US 2012/0118674 A1    May 17, 2012

Related U.S. Application Data

(62) Division of application No. 12/957,128, filed on Nov. 30, 2010, now Pat. No. 8,100,230, which is a division of application No. 11/207,539, filed on Aug. 19, 2005, now Pat. No. 7,841,450.

(51) Int. Cl.
*B66B 9/00*  (2006.01)

(52) U.S. Cl. .......................................... 187/249; 187/383

(58) Field of Classification Search ................... 187/247, 187/249, 380–389, 391–393
See application file for complete search history.

(56) References Cited

U.S. PATENT DOCUMENTS

| | | | |
|---|---|---|---|
| 1,837,643 A | 12/1931 | Anderson | |
| 1,911,834 A | 5/1933 | Lindquist | |
| 5,419,414 A | 5/1995 | Sakita | |
| 5,663,538 A * | 9/1997 | Sakita | 187/382 |
| 5,752,585 A | 5/1998 | Bittar et al. | |
| 5,773,772 A * | 6/1998 | McCarthy et al. | 187/289 |
| 5,861,587 A | 1/1999 | Powell et al. | |
| 5,877,462 A * | 3/1999 | Chenais | 187/249 |
| 5,924,524 A | 7/1999 | Barker et al. | |
| 6,871,727 B2 * | 3/2005 | Jokela et al. | 187/383 |
| 6,978,863 B2 * | 12/2005 | Hikita | 187/382 |
| 6,991,068 B2 | 1/2006 | Siikonen et al. | |
| 7,128,190 B2 | 10/2006 | Kostka et al. | |
| 7,198,136 B2 * | 4/2007 | Urata | 187/383 |
| 7,213,685 B2 | 5/2007 | Hikita | |
| 7,360,629 B2 * | 4/2008 | Hagi et al. | 187/249 |
| 7,392,884 B2 | 7/2008 | Hikita | |
| 7,650,966 B2 * | 1/2010 | Sansevero et al. | 187/249 |
| 7,650,967 B2 * | 1/2010 | SikShin et al. | 187/249 |
| 7,841,450 B2 * | 11/2010 | Smith et al. | 187/249 |
| 7,917,341 B2 * | 3/2011 | Sansevero et al. | 703/1 |
| 8,100,230 B2 * | 1/2012 | Smith et al. | 187/249 |

FOREIGN PATENT DOCUMENTS

JP        03238275 A  * 10/1991

OTHER PUBLICATIONS

International Search Report dated Feb. 20, 2007 for Application No. PCT/US06/31093.
Reuter, G. "Twin Lift System", Elevator World (Apr. 2004) pp. 58-64.
Gale, J., "ThyssenKrupp's TWIN Lift System", Elevator World (Jul. 2003) pp. 51-53.

* cited by examiner

*Primary Examiner* — Anthony Salata
(74) *Attorney, Agent, or Firm* — Frost Brown Todd LLC

(57) ABSTRACT

An elevator system includes at least two independently operable elevator cars in an elevator shaft. The elevator system controls loading of one of the car at ground floor level by moving the other car to a level below the ground floor level.

4 Claims, 7 Drawing Sheets

ZONED ELEVATOR SYSTEM

This is a divisional of U.S. patent application Ser. No. 12/957,128 filed on Nov. 30, 2010, which is a divisional of U.S. patent application Ser. No. 11/207,539 filed on Aug. 19, 2005, the disclosures of both are incorporated herein by reference.

FIELD OF THE INVENTION

The present invention relates to systems and methods of deploying elevator systems, in particular, the deployment of a plurality of deployment schemes associated with twin elevator systems.

BACKGROUND OF THE INVENTION

In multi-storey buildings, one of the main objectives is to efficiently transport passengers to various floors using an elevator system. In designing, developing, and deploying elevator systems, particular attention should be paid to the portion of the building core that is dedicated to the elevator system. For example, as the number of elevator shafts are increased to meet the demands of higher buildings, maximizing real estate space as a commodity is also a main concern that must be addressed. Therefore, the object is to try and minimize the required number of elevator shafts that are deployed within an elevator system, while also trying to effectively meet the transportation needs of passengers and freight within the building. For example, a poorly designed elevator system may cause unacceptable delays for passengers trying to reach a desired floor. However, solutions to try and reduce the number of shafts and improve service have included higher elevator travel speeds, shorter door opening/closing times, advanced control systems, express elevators, splitting buildings into zones, etc. These solutions, while relatively successful in addressing some of the challenges, may not be acceptable by the user. These reasons may include a feeling of unease when elevators accelerate, doors quickly closing, or difficulties that may be experienced as the result of using a complicated system, where passengers may have to change one or several times to get to a desired floor.

Despite the mentioned optimization measures, it is evident that the largest part or portion of the elevator shaft is not used when the elevator car is in another part of the shaft. One solution attempting to capitalize on this is the double-decker elevator. However, some of the disadvantages of such a system are the large scale drives and power supplies that become necessary for accelerating such a large mass. Also, as the cars are semi-connected, the delays for passengers waiting for other passengers to exit and enter the elevator may be more as a result of two floors being simultaneously served. Moreover, the stories of the building would have to be virtually equidistant, which is an expensive objective to meet in a building.

It is therefore an object of the present invention to provide an elevator system that is capable of effectively maximizing an elevator shaft by accommodating more than one independently controllable elevator car within a shaft.

It is another object of the present invention to deploy various elevator schemes using more than one elevator car within each elevator shaft based on different buildings, where each building comprises a different number of floors and elevator shafts.

BRIEF SUMMARY OF THE INVENTION

The present invention provides elevator system architectures and methods that employ the use of two elevator cars within a single elevator shaft, where each of the two elevator cars move independently of each other within the shaft.

An aspect of the present invention according to the present invention provides an elevator system having at least two independently operable elevator cars in each of a plurality of elevator shafts within a building. The system comprises at least one first elevator shaft having a lower first and a lower second region, where a first elevator car moves within the lower first region and a second elevator car moves within the lower second region. Both the first and second elevators are moveably controlled independently of each other, where each elevator car moves independently of the other in the first elevator shaft. The elevator system also comprises at least one second elevator shaft having an upper first and an upper second region, where a third elevator car moves within the upper first region and a fourth elevator car moves within the upper second region. The third and fourth elevator are also moveably controlled independently of each other, where each elevator car moves independently of the other in the second elevator shaft.

Another aspect of the present invention according to the present invention provides an elevator system within a building that comprises at least one first elevator shaft that includes a lower first and a lower second region. A first elevator car moves within the lower first region and a second elevator car moves within the lower second region, wherein the first and second elevator are moveably controlled independently of each other. At least one second elevator shaft has a lower sky lobby and an upper sky lobby separated from the lower sky lobby by a plurality of mid-level floors, whereby a third elevator car moves between a ground floor of the building and the lower sky lobby, and a fourth elevator car moves between the ground floor and the upper sky lobby. The third and fourth elevator are also moveably controlled independently of each other.

Yet another aspect of the present invention provides an elevator system having two elevator cars within each elevator shaft for providing goods and passenger transportation to a plurality of floors of a building. The elevator system comprises at least one elevator shaft comprising a virtual landing region located above a top floor of the plurality of floors of the building. A goods elevator car moves within the at least one elevator shaft between a basement floor and the top floor associated with the plurality of floors. A passenger elevator car moves within the at least one elevator shaft between a ground floor associated with the plurality of floors and the virtual landing, wherein the passenger elevator car moves into the virtual landing for allowing accessibility of the goods elevator car to the top floor. The goods elevator car and passenger elevator car are moveably controlled independently of each other within the at least one elevator shaft, whereby each elevator car moves independently of the other in the at least one elevator shaft.

According to another aspect of the present invention, an elevator system comprises two elevator cars within each elevator shaft for passenger transportation to a plurality of floors of a building. The elevator system further comprises at least one elevator shaft comprising a first region and a second region, where the first region extends from a ground level to a plurality of sub-ground levels. The second region extends from the ground level to a top floor of the building, where a first and a second elevator car move within the at least one elevator shaft. The first elevator car moves within the first region and the second elevator car moves within the second region, wherein the first and the second elevator cars are moveably controlled independently of each other within the at least one elevator shaft.

According to yet another aspect of the present invention, a method of operating an elevator system comprises a first and a second independently operable elevator car within each elevator shaft within a building. The method comprises the steps of assigning the first elevator to operate within a first region of the elevator shaft, and assigning the second elevator to operate within a second region of the elevator shaft, where the second region is located above the first region. The first and the second elevator car are loaded from a ground floor level, where the loading of the second elevator car from the ground floor is controlled by moving the first elevator below the level of the ground floor to a lower level zone.

In accordance with another aspect of the present invention, a method is provided for operating an elevator system comprising a first and a second independently operable elevator car within each at least one elevator shaft of a building. The method comprises the steps of providing passenger transportation between a ground floor level and a top floor of the building using the first elevator car within the at least one elevator shaft. Also provided is passenger transportation between a sub-ground floor level and a top floor of the building using the second elevator car within the at least one elevator shaft. The loading of the first elevator car from the top floor is controlled by moving the second elevator above the level of the top floor to a virtual landing region.

DETAILED DESCRIPTION OF THE INVENTION

Figure 1:
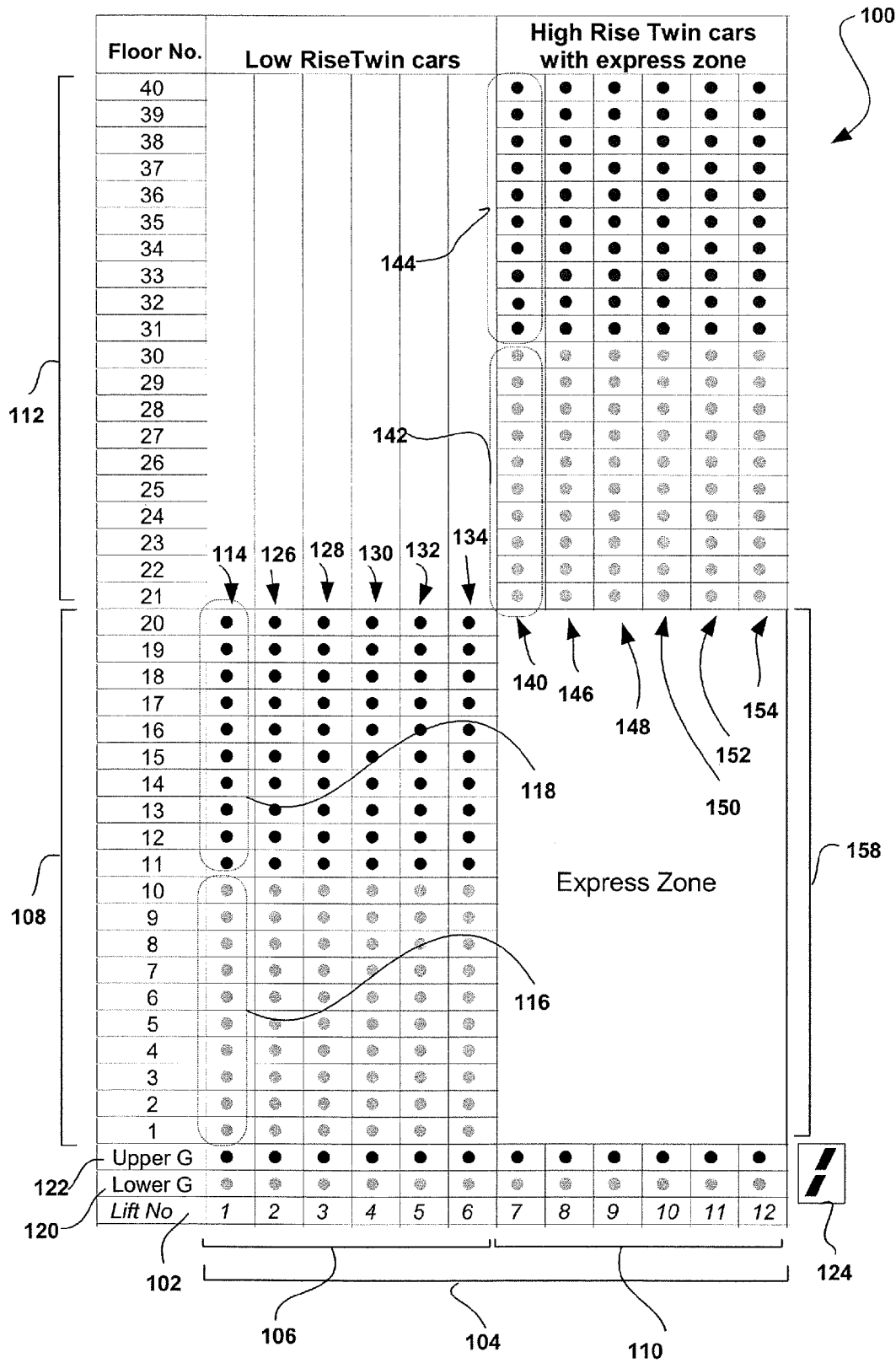
FIG. 1 illustrates an elevator system deployment scheme employing two independently moving elevator cars operating within each elevator shaft according to an aspect of the present invention, where the lower floors are serviced by a first group of elevator cars, and the upper floors are serviced by a second group via an express zone.

FIG. 1 illustrates an elevator system deployment scheme 100 employing two independently moving elevator cars (Twin Cars) operating within each elevator shaft according to an aspect of the present invention. The system 100 according to the present invention represents a zoned twin elevator system. Each elevator car or lift operates within an elevator shaft, where each shaft is designated by a lift number 102 (e.g., 1-12). Elevator shafts 1-12, as indicated by 104, are illustrated at the bottom of deployment scheme 100, where a first group of elevator shafts, indicated by 106, provide transportation services to a first region of floors within a building (e.g., floors 1-20), as indicated by 108. A second group of elevator shafts, indicated by 110, similarly provide transportation services to a second region of floors with the building (e.g., floors 21-40), as indicated by 112.

Within the first group of elevator shafts, indicated by 106, elevator shaft 114 comprises a twin elevator system incorporating two elevator cars that move independently of each other, where independent motion is enabled by providing separate counter weight, rope, and traction drive units for each elevator car. A first region 116 within shaft 114, denoted by lighter colored circles, indicate the floors (i.e., floors 1-10) that are serviced by a first elevator car (not shown) associated with the twin elevator cars. A second region 118 within shaft 114, denoted by the dark colored circles, indicate floors (i.e., floors 11-20) that are serviced by a second elevator car (not shown). Passengers or uses requiring transportation to floors in the first region 116 may enter the first elevator car on a lower ground level 120 of the building, whereas passengers or users traveling to the floors associated with the second region 118 may enter the second elevator car from the upper ground level 122. Access between the upper and lower ground levels may be provided, for example, by a connecting stair case, a shuttle elevator, and/or an escalator 124. All the other elevator shafts 126,128, 130, 132,134 within the first group of elevators 106 are identical to that of elevator shaft 114, described above.

The number of elevator shafts designated for each elevator group, and the number of floors associated with each region (e.g., floors 1-10 in the first region 116) are for purposes of illustration and not limitation, and may vary according to various elevator system design factors (e.g., building size, traffic, etc.). Also, it may be possible to increase the number of elevator cars operating within each shaft to more than two.

One or more elevator system controllers (not shown) may include various safety and monitoring procedures for ensuring that the independently moving elevator cars sharing a shaft do not come within a certain range or distance of each other for collision avoidance and safety purposes.

Within the second group of elevator shafts, indicated by 110, elevator shaft 140 also comprises a twin elevator system incorporating two elevator cars that move independently of each other. A first region 142 within shaft 140, denoted by lighter colored circles, indicate the floors (i.e., floors 21-30) that are serviced by a first elevator car (not shown) associated with the twin elevator cars. A second region 144 within shaft 140, denoted by the dark colored circles, indicate floors (i.e., floors 31-40) that are serviced by a second elevator car (not shown). Passengers or users requiring transportation to floors in the first region 142 may enter the first elevator car on a lower ground level 120 of the building, whereas passengers or users traveling to floors associated with the second region 144 may enter the second elevator car from upper ground level 122. As previously described, access between the upper and lower ground levels may be provided, for example, by a connecting stair case, a shuttle elevator, and/or an escalator 124. All the other elevator shafts 146, 148, 150, 152, 154 within the second group of elevators 110 are identical to that of elevator shaft 140, described above. The second group of elevator cars 110 comprise a express zone 158 over which the elevator cars do not stop until the upper region floors (i.e., floors 21-40) have been reached.

Use of two elevator cars within each shaft, and the provision of an express zone 158, reduces the number of elevator shafts required in comparison to systems employing single elevator cars operating within each shaft for a given traffic or utilization factor. The express zone facilitates an expedited service for passengers wishing to be transported to the upper floors of the building, while simultaneously providing the advantages of multiple elevator cars within each shaft.

Figure 2:
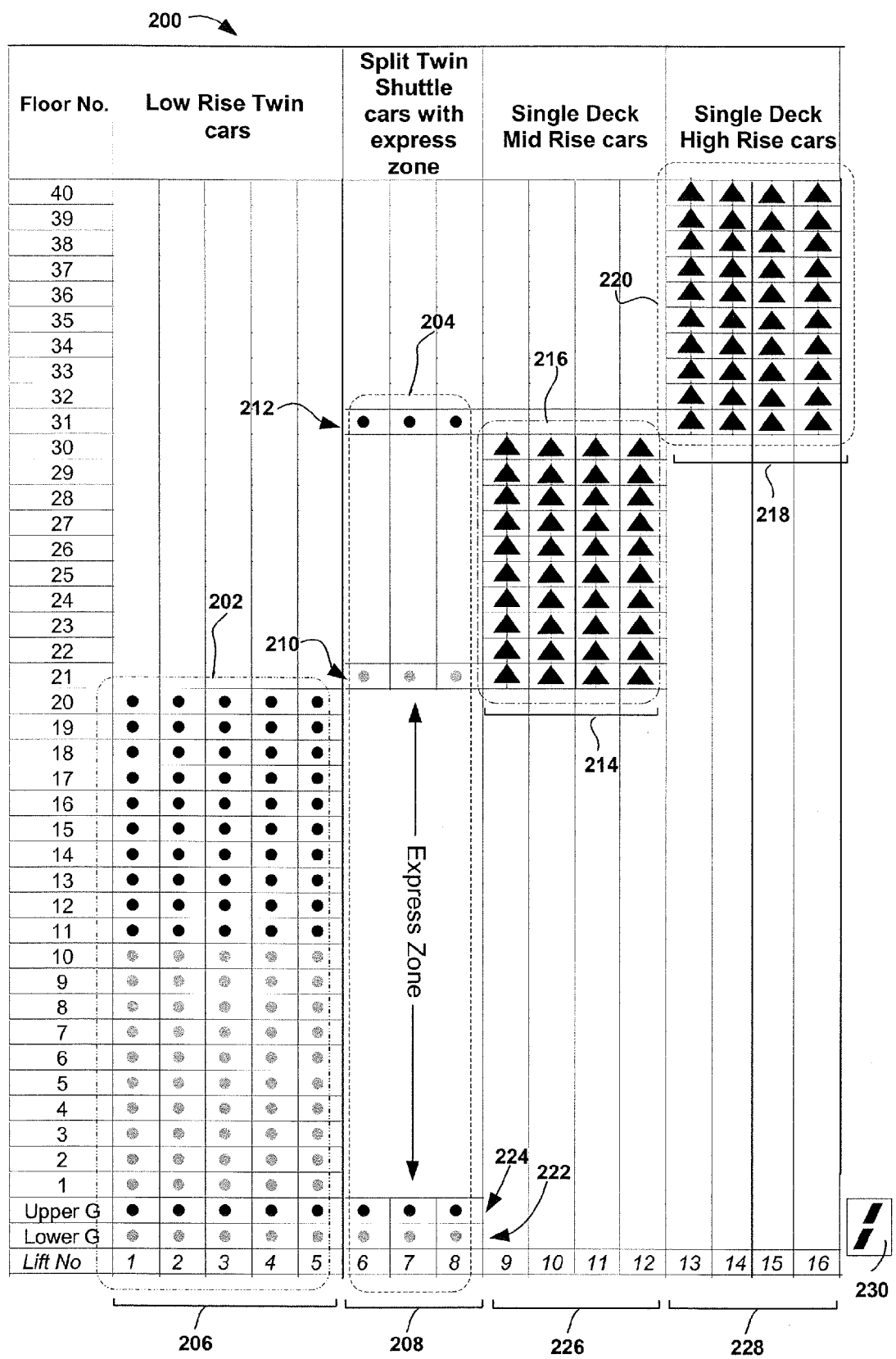
FIG. 2 illustrates an elevator system deployment scheme employing two independently moving elevator cars operating within each elevator shaft according to an aspect of the present invention, where the upper floors are serviced by two shuttle cars operating within the same elevator shaft.

FIG. 2 illustrates an elevator system deployment scheme 200 employing two independently moving elevator cars (Twin Cars) operating within each elevator shaft according to another aspect of the present invention. The scheme 200 according to the present invention represents a hybrid elevator system comprising a twin elevator scheme 202 and a split twin shuttle scheme 204. Elevator scheme 202 is identical to that of region 106 shown in FIG. 1, where shafts 1-5, as indicated by 206, each include two elevator cars within each shaft for servicing floors 1-20. The split twin shuttle scheme 204 comprises a plurality of shafts 208 (i.e., shafts 6-8), where each shaft has two elevator cars that travel between a ground level and a lower and upper sky lobby 210, 212. A first elevator car (not shown) transports passengers between a lower ground floor level 222 and the lower sky lobby 210 (lighter colored circles). At the lower sky lobby 210, the passengers may access a bank of elevators 214 that service the mid-level floors of the building, as indicated by region 216. Similarly, a second elevator car (not shown) transports passengers between an upper ground floor level 224 and the upper sky lobby 212 (dark colored circles). At the upper sky lobby 212, the passengers may access another bank of elevators 218 that service the upper-level floors of the building, as indicated by region 220.

As illustrated in FIG. 2, elevator banks 214 and 218 are accessible from the upper level floors (i.e., floor 21 and 31, respectively). This provides an advantage where the shafts for these elevator banks 214, 218 do not have to extend down to the ground floor level as the elevator cars are operable from their respective sky lobbies. Accordingly, elevator shafts 9-12, indicated by 226, are not required to extend from floor 21 to the lower ground level 222. Similarly, elevator shafts 13-16, indicated by 228, are not required to extend from floor 31 to the upper ground level 224. This provides an increase in building core space, in addition to providing more efficient elevator traffic management.

Passengers requiring transportation to lower sky lobby 210 may enter the first elevator car on the lower ground level 222 of the building, whereas passengers traveling to upper sky lobby 212 may enter the second elevator car from the upper ground level 224. Access between the upper and lower ground levels 222, 224 may be provided, for example, by a connecting stair case, a shuttle elevator, and/or an escalator 230. Also, elevator cars associated with elevator shafts 1-5, as indicated by 206, may be accessed from the lower or upper ground levels 222, 224 depending on whether passengers require transportation to the lower level floors, denoted by the lighter colored circles, or the upper floors, as indicated by the dark colored circles.

Figure 3:
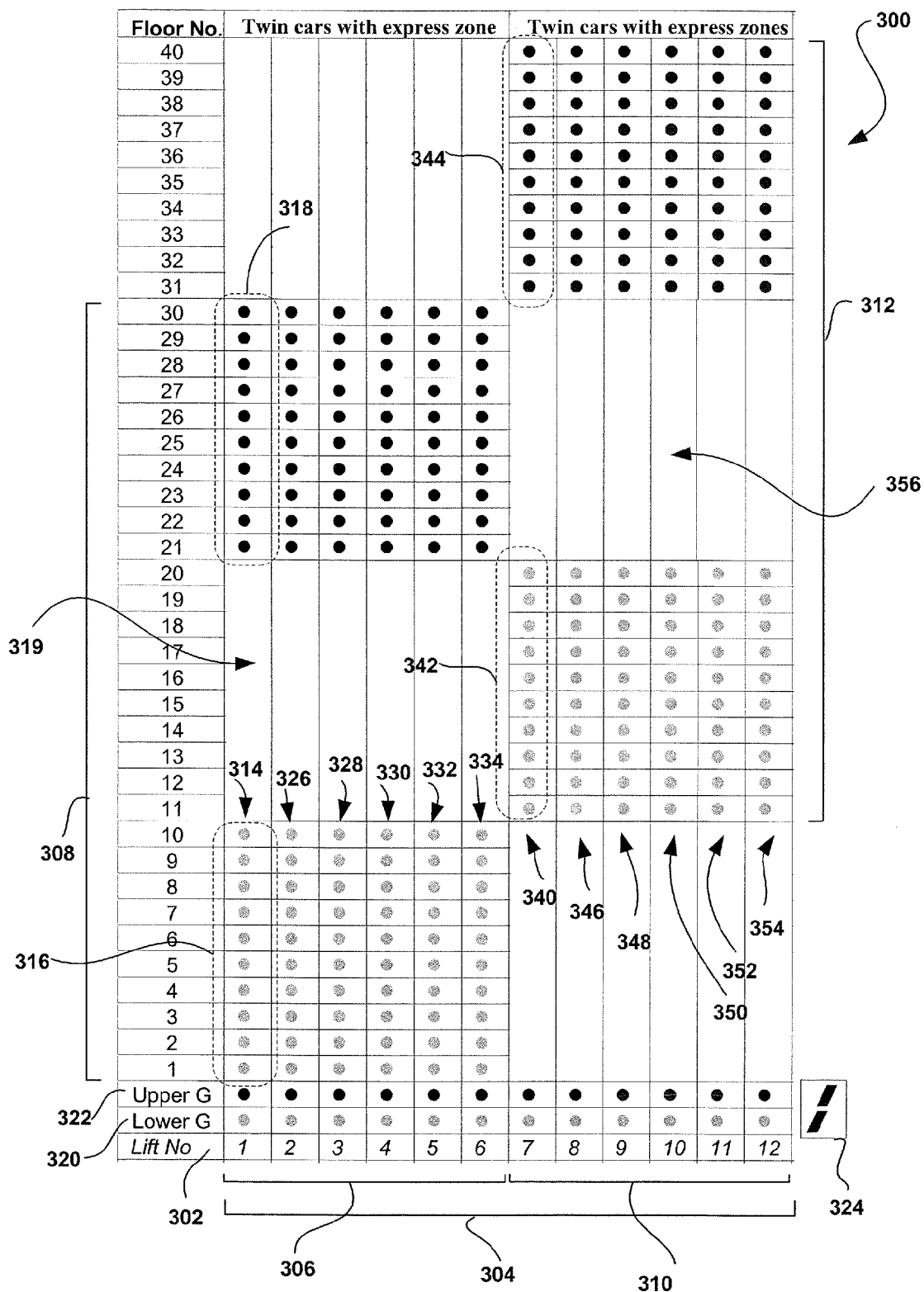
FIG. 3 illustrates an elevator system deployment scheme employing two independently moving elevator cars operating within each elevator shaft according to an aspect of the present invention, where an elevator motion-free zone is established within each shaft.

FIG. 3 illustrates an elevator system deployment scheme 300 comprising two independently moving elevator cars (Twin Cars) operating within each elevator shaft according to an aspect of the present invention. The system 300 according to the present invention represents a zoned twin elevator system, where each zone has a respective express region therebetween.

Each elevator car operates within an elevator shaft, where each shaft is designated by a lift or elevator number 302 (e.g., 1-12). Elevator shafts 1-12, as indicated by 304, are illustrated at the bottom of deployment scheme 300, where a first group of elevator shafts, indicated by 306, provide transportation services to a first region of floors within a building (e.g., floors 1-30), as indicated by 308. A second group of elevator shafts, indicated by 310, similarly provide transportation services to a second region of floors with the building (e.g., floors 11-40), as indicated by 312.

Within the first group of elevator shafts, indicated by 306, elevator shaft 314 comprises a twin elevator system incorporating two elevator cars that move independently of each other within the shaft. Independent motion is enabled by providing separate counter weight, rope, and traction drive units for each elevator car. Other known methods known in the art of elevator motion and control may be incorporated to achieve independent movement of the elevator cars. A first region 316 within shaft 314, denoted by lighter colored circles, indicates the floors (i.e., floors 1-10) that are serviced by a first elevator car (not shown), and a second region 318 within shaft 314, denoted by the dark colored circles, illustrates floors (i.e., floors 21-30) that are serviced by a second elevator car (not shown). As illustrated in the figure, an express region 319 is located between regions 316 and 318, which expedites the transportation of passengers to the upper floors of the elevator cars operating within the first group of elevator shafts indicated by 306. The express region 319 also simplifies the safety and control capabilities of the elevator control system. This is facilitated by the physical separation between any two elevator cars operating in their designated regions within each shaft. For example, there is a ten floor separation between the first elevator car operating within region 316 and the second elevator car operating within region 318. In such a scenario, the closest proximity between the cars operating in regions 316 and 318 is ten floors, which accounts for a relatively safe distance between the cars. If either car violates this distance, either or both elevator cars can be safely closed down using less complex sensor and control programming.

Passengers requiring transportation to floors in the first region 316 may enter the first elevator car on a lower ground level 320 of the building, whereas passengers or users traveling to the floors associated with the second region 318 may enter the second elevator car from the upper ground level 322. Access between the upper and lower ground levels may be provided, for example, by a connecting stair case, a shuttle elevator, and/or an escalator 324. All the other elevator shafts 326, 328, 330, 332, 334 within the first group of elevators 306 are identical to that of elevator shaft 314, described above.

The number of elevator shafts designated for each elevator group, and the number of floors associated with each region (e.g., floors 1-10 in the first region 316) are for purposes of illustration and not limitation, and may vary according to various elevator system design factors (e.g., building size, traffic, etc.). Also, it may be possible to increase the number of elevator cars operating within each shaft to more than two.

One or more elevator system controllers (not shown) may include various safety and monitoring procedures for ensuring that the independently moving elevator cars sharing a shaft do not come within a certain range or distance of each other for collision avoidance and safety purposes.

Within the second group of elevator shafts, indicated by 310, elevator shaft 340 also comprises a twin elevator system incorporating two elevator cars that move independently of each other. A first region 342 within shaft 340, denoted by lighter colored circles, indicate the floors (i.e., floors 21-30) that are serviced by a first elevator car (not shown) associated with the twin elevator cars. A second region 344 within shaft 340, denoted by the dark colored circles, indicate floors (i.e., floors 31-40) that are serviced by a second elevator car (not shown). As illustrated in the figure, an express region 356 is also located between regions 342 and 344, which expedites the transportation of passengers to the upper floors of the elevator cars operating within the first group of elevator shafts indicated by 310. The express region 356 also simplifies the safety and control capabilities of the elevator control system. This is facilitated by the physical separation between any two elevator cars operating in their designated regions within each shaft.

Passengers or users requiring transportation to floors in the first region 342 may enter the first elevator car on a lower ground level 320 of the building, whereas passengers or users traveling to floors associated with the second region 344 may enter the second elevator car from upper ground level 322. As previously described, access between the upper and lower ground levels may be provided, for example, by a connecting stair case, a shuttle elevator, and/or an escalator 324. All the other elevator shafts 346, 348, 350, 352, 354 within the second group of elevators 310 are identical to that of elevator shaft 340, described above.

Figure 4:
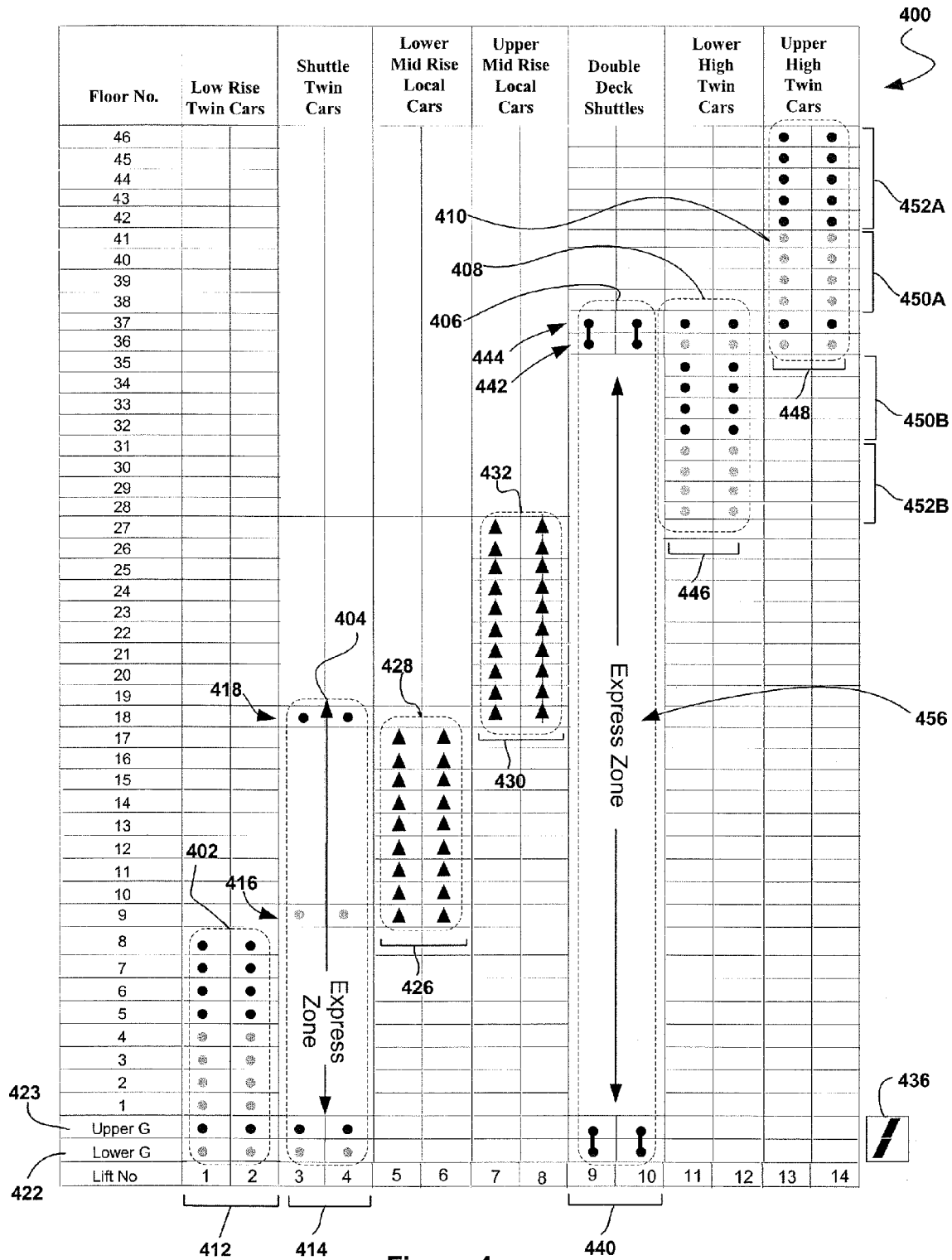
FIG. 4 illustrates an elevator system deployment scheme employing two independently moving elevator cars operating within each elevator shaft according to an aspect of the present invention, where the upper floors are serviced by double deck shuttles for transporting passengers to lobbies that provide access to the upper floors that utilize the two independently moving elevator cars operating within each elevator shaft.

FIG. 4 illustrates a yet another hybrid elevator system deployment scheme 400, which includes two independently moving elevator cars (Twin Cars) operating within each elevator shaft according to another aspect of the present invention. The scheme 400 according to the present invention represents a hybrid elevator system comprising a zoned twin elevator scheme 402, a split twin shuttle scheme 404, a double deck elevator shuttle 406, and an upper and lower zoned twin elevator scheme 408, 410. Elevator scheme 402 is identical to that of scheme 202 illustrated and described in connection with FIG. 2, where shafts 1-2, as indicated by 412, each include two elevator cars within each shaft for servicing floors 1-8.

The split twin shuttle scheme 404 is identical to that of scheme 204 illustrated and described in connection with FIG. 2, and comprises a plurality of shafts 414 (i.e., shafts 3-4), where each shaft has two elevator cars that travel between a ground level and a lower mid-level and upper mid-level sky lobby 416, 418, respectively. A first elevator car (not shown) transports passengers between a lower ground floor level 422 and the lower mid-level sky lobby 416 (lighter colored circles) via an express zone 417. At the lower mid-level sky lobby 416, the passengers may access a bank of elevators 424 that service the lower mid-level floors of the building, as indicated by region 426. Similarly, a second elevator car (not shown) transports passengers between an upper ground floor level 423 and the upper mid-level sky lobby 418 (dark colored circles) via express zone 417. At the upper mid-level sky lobby 418, the passengers may access another bank of elevators 430 that service the upper mid-level floors of the building, as indicated by region 432.

As illustrated in FIG. 4, elevator banks 426 and 430 are accessible from the mid level floors (i.e., floor 9 and 18, respectively). This provides an advantage, where the shafts corresponding to these elevator banks 426, 430 do not have to extend down to the ground floor level, as the elevator cars are operable from their respective sky lobbies (i.e., floor 9 and 18, respectively). Accordingly, elevator shafts 5-6, indicated by 426, are not required to extend from floor 9 to the lower ground level 422. Similarly, elevator shafts 7-8, indicated by 430, are not required to extend from floor 17 to the upper ground level 423. This provides an increase in building core space, in addition to providing more efficient elevator traffic management.

Passengers requiring transportation to lower mid-level sky lobby 416 may enter the first elevator car on the lower ground level 422 of the building, whereas passengers traveling to upper mid-level sky lobby 418 may enter the second elevator car from the upper ground level 423. Access between the upper and lower ground levels 422, 423 may be provided, for example, by a connecting stair case, a shuttle elevator, and/or an escalator 436. Also, elevator cars associated with elevator shafts 1-2, as indicated by 412, may be accessed from the lower or upper ground levels 422, 423 depending on whether passengers require transportation to the lower level floors, denoted by the lighter colored circles, or the upper floors, as indicated by the dark colored circles.

The double deck elevator shuttle scheme 406 illustrated in FIG. 4 comprises a plurality of shafts (i.e., 9-10), as indicated by 440. Each shaft includes a double deck elevator car (not shown) which comprises a lower deck elevator car coupled to an upper deck elevator car. When the double deck elevator car is at any given floor, the upper deck elevator car concurrently serves the floor immediately above the floor served by the lower deck elevator car. The double deck elevator car associated with each of the plurality of shafts 440, provides passenger transportation between the upper and lower ground floor levels 422, 423, and a first and second upper-level lobby 442, 444, respectively.

At the first and second upper-level lobby 442, 444, elevator banks 446 and 448 associated with upper and lower zoned twin elevator schemes 408, 410 are accessible. The respective shafts within elevator banks 446 and 448, each include two independently moving first and second elevator cars (i.e., twin system). Zoned twin scheme 408 comprises a top down zoned twin system, whereby floor region 450B is serviced by a first elevator car operating within each shaft (i.e., Lift No. 11-12) and floor region 452B is, similarly, serviced by a second elevator car operating within each shaft (i.e., Lift No. 11-12). Zoned twin scheme 410 comprises floor region 450A, which is serviced by a first elevator car operating within each shaft (i.e., Lift No. 13-14) and floor region 452A is, similarly, serviced by a second elevator car operating within each shaft (i.e., Lift No. 11-12) of the zoned twin system.

Passengers requiring access to floor regions 450B and 452A may access elevator banks 446 and 448 by taking one of the double deck elevator cars (i.e., Lift No. 9 or 10) from upper ground level 423 to the second upper-level lobby 444. Similarly, floor regions 450A and 452B may be accessed via elevator banks 446 and 448 by taking one of the double deck elevator cars (i.e., Lift No. 9 or 10) from lower ground level 422 to the first upper-level lobby 442. The upper and lower zoned twin elevator schemes 408, 410 are accessed by the double deck elevator shuttle scheme 406 and, thus, provide an efficient means of traffic management, whereby passengers requiring service to the upper floors of the building are transported via express zone 456 to the upper-level lobbies 442, 444. This also enables the elevator shafts within elevator banks 446 and 448 to extent only as far down as the lowest floor for which they provide service. For example, the elevator shafts associated with elevator bank 446 may only need to extend as far "floor 28," which facilitates the use of core building space below this floor (i.e., floor 28). Also, the shafts of elevator bank 448 may only need to extend from the top region of the building to "floor 37." Hence, the use of core building space below "floor 37" is mad made available. The number of floors and elevator shafts (i.e., indicated by lift no.) illustrated in connection with FIG. 4 are for purposes of illustration and not of limitation. For example, the number of floors and elevator shafts may be increased in accordance with traffic management, elevator system design principles, and/or other factors.

Figure 5:
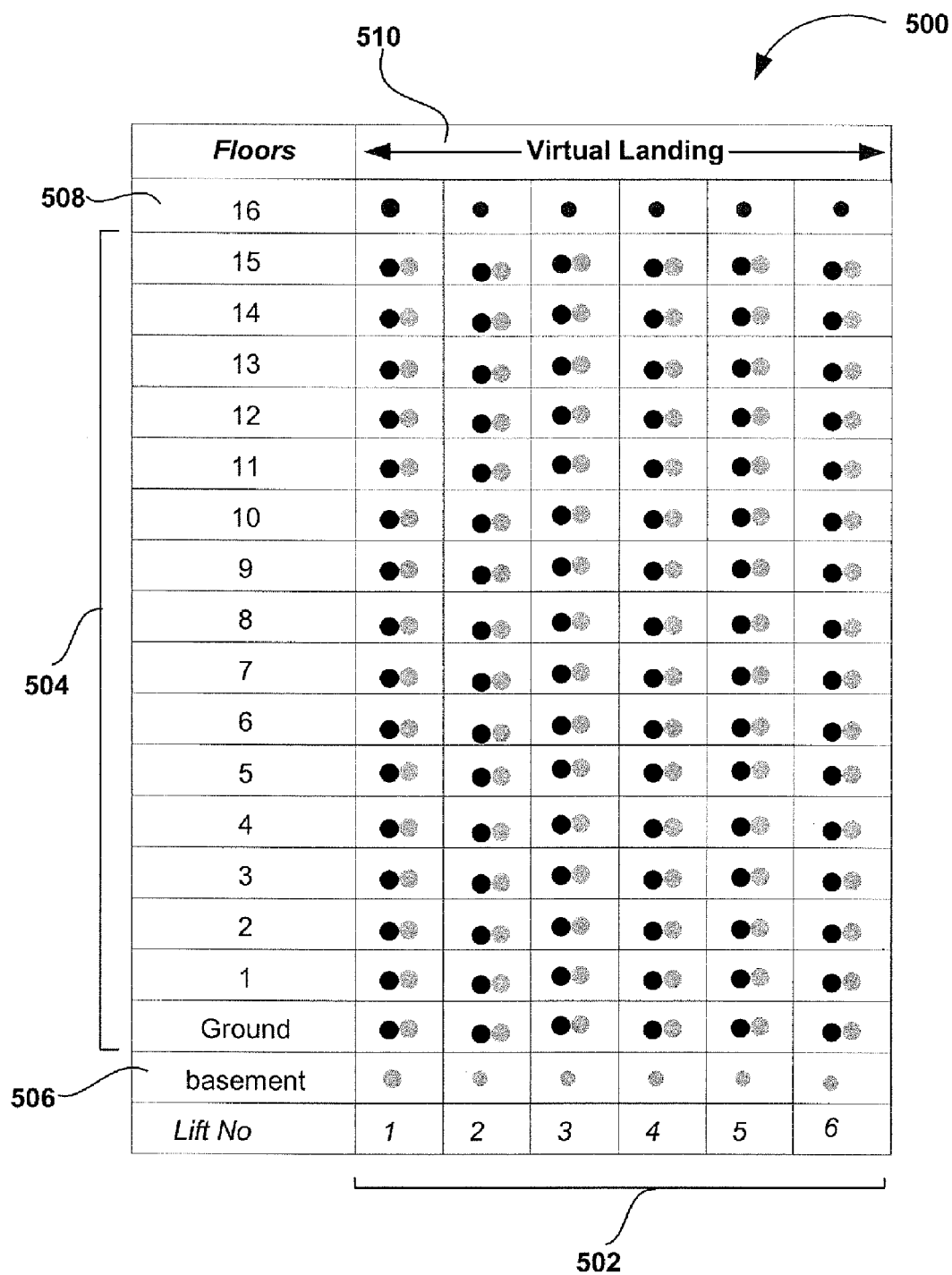
FIG. 5 illustrates an elevator system deployment scheme employing two independently moving elevator cars operating within each elevator shaft according to an aspect of the present invention, where an upper floor virtual landing is provided.

FIG. 5 illustrates an elevator deployment scheme 500 for providing a combination of goods and passenger transportation according to an aspect of the present invention. In the embodiment of FIG. 5, transportation of both goods and passengers is provided by two independently moving elevator cars operating within each shaft, as indicated by 502. Each elevator shaft comprises a lower and an upper elevator car, where transportation provided by the lower elevator car is indicated by the lighter colored circles and service provided by upper car is identified by the dark colored circles. Transportation between the ground floor level and a floor immediately below the top floor (i.e., $15^{th}$ floor), as indicated by 504, is provided by both the upper and lower elevator cars moving within each shaft. Transportation to the basement 506 is provided by the lower elevator car only. Also, transportation to the top floor 508 (i.e., $16^{th}$ floor) is normally provided by the upper elevator car. However, if a virtual landing area 510 is provided, the upper elevator may move into the virtual landing area 510, allowing the lower elevator car to service or provide transportation to the top floor 508. The virtual landing may comprise a location in the hoistway or elevator shaft, where one of the twin elevator cars can be moved in order to make way for the other elevator car operating within the same elevator shaft.

For illustrative purposes, the lighter colored circles designate the floors that receive transportation services from the lower elevator cars within each of elevator shafts 1-6, defined by 502. The lower elevator cars may be used as a goods or services elevator. The darker colored circles designate the floors that receive transportation services from the upper elevator cars within each of elevator shafts 1-6, defined by 502, whereby the upper elevator cars may provide passenger transportation.

As both elevator cars within each elevator shaft have access to a common set of floors within a building, the minimum permissible safe distance between the upper and lower elevator cars may be a single floor. For example, the lower elevator car may be on the $5^{th}$ floor and the upper elevator car may be directly above it on the $6^{th}$ floor. The control mechanisms for controlling and maintaining a safe distance between the upper and lower elevator cars may depend on the elevator controller system (not shown) and sensory technology (not shown) employed. For example, based on safety and other considerations, a minimum safe distance of two or more floors may be required between the elevator cars.

The elevator controller may also provide a priority based elevator dispatching process, that assigns a higher priority to passenger transportation relative to goods or services transportation. Therefore, the controller system may ensure that the elevator shafts are mainly free and not obstructed by the lower goods elevator cars during periods when passenger traffic is high (e.g., 5 pm in an office building).

Figure 6:
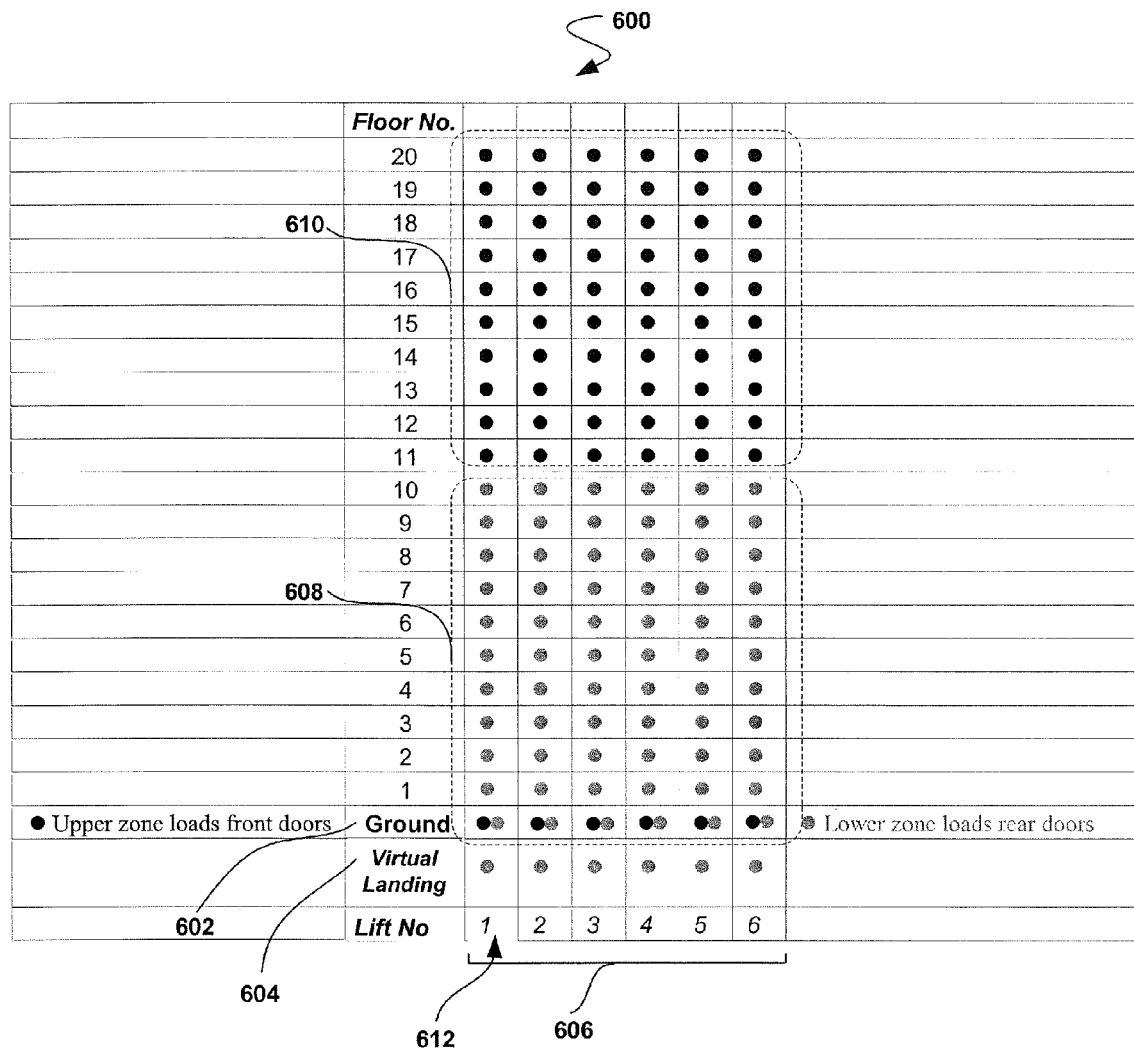
FIG. 6 illustrates an elevator system deployment scheme employing two independently moving elevator cars operating within each elevator shaft according to an aspect of the present invention, where a lower ground level virtual landing is provided.

FIG. 6 illustrates an elevator deployment scheme 600 comprising a zoned twin elevator system according to an aspect of the present invention. The zoned twin elevator is identical to the zoned twin system described and illustrated in connection with FIG. 1, accept that deployment scheme 600 comprises a single ground floor level 602 (i.e., no upper and lower ground floor level) and a virtual landing 604 that is located beneath ground level 602. Each of the elevator shafts, indicated by 606, include two elevator cars (not shown) independent operating within them. As previously described, each elevator operates within a region or zone. For example, within each shaft (e.g., shaft 612), a first elevator car provides transportation between the ground floor 602 and the $10^{th}$ floor of the building, as indicated by region 608, and designated by the lighter colored circles. Also within each shaft, a second elevator car provides transportation from the ground floor 602 to the upper floors of the building (i.e., floors 11-20), as indicated by region 610, and designated by the darker colored circles.

As illustrated in FIG. 6, both the first and second elevator cars may load passengers from the ground level 602. The first elevator cars operating in region 608 may load passengers from their rear doors and the second elevator cars operating in region 610 load passengers from their front doors. At any given instant, only one of the elevator cars operating within each shaft can access the ground floor 602 for the purpose of loading passengers. If, for example, the second elevator car operating in region 610 is assigned to load passengers from the ground floor 602, the first elevator car operating in region 608 must be relocated to the virtual landing 604 in order to allow the second elevator to access the ground floor 602.

If the first elevator car operating in region 608 is assigned to load passengers from the ground floor 602, the second elevator car should be operating within region 610 or be located at a minimum safe distance above the first elevator car in compliance with the safety standards and mechanisms in place.

Figure 7:
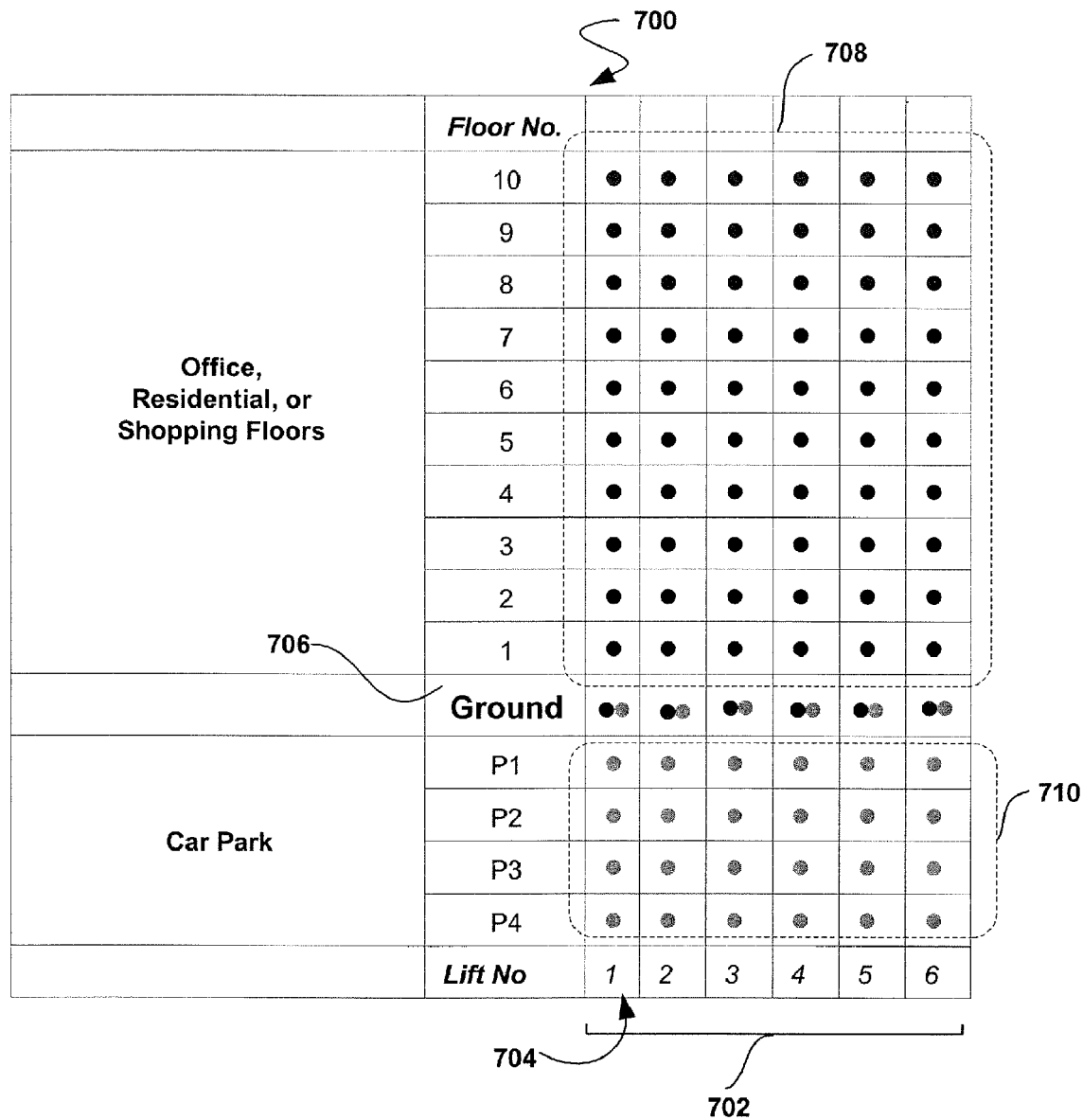
FIG. 7 illustrates an elevator system deployment scheme employing two independently moving elevator cars operating within each elevator shaft according to an aspect of the present invention, where one of the two independently moving elevator cars services sub-ground level floors, and the other elevator car accordingly services the floors above ground level.

FIG. 7 illustrates an elevator deployment scheme 700 comprising a zoned twin elevator system according to an aspect of the present invention. Each of the elevator shafts, indicated by 702, include two elevator cars (not shown) independent operating within them. As previously described, each elevator operates within a region or zone. For example, within each shaft (e.g., shaft 704), a first elevator car provides transportation between the ground floor 706 and the top floor of the building, as indicated by region 708, and designated by the dark colored circles. Also within each shaft, a second elevator car provides transportation from the ground floor 706 to the sub-ground level floors of the building (i.e., floors P1-P4), as indicated by region 710, and designated by the lighter colored circles. The sub-ground level floors, indicated by 710, may, for example, be parking levels underneath the building. The floor levels located above ground level 706, may for example, be residential apartments, offices, and/or commercial shopping floors.

As illustrated and described in connection with FIG. 6, elevator deployment scheme 700 comprises a single ground floor level 702 (i.e., no upper and lower ground floor level). Both the first and second elevator cars within each shaft may load passengers from the ground level 702. The first elevator cars operating in region 708 may load passengers from their front doors and the second elevator cars operating in region 710 (i.e., parking levels) may load passengers from their rear doors. At any given instant, only one of the elevator cars operating within each shaft can access the ground floor 702 for the purpose of loading passengers. If, for example, the second elevator car operating in region 710 is assigned to load passengers from the ground floor 702 for the purpose of transporting them to the parking area, the first elevator car operating in region 708 should remain operating at a minimum safe distance from the second elevator car in region 708.

If the first elevator car operating in region 708 is assigned to load passengers from the ground floor 702, the second elevator car should be operating within region 710 and be located at a minimum safe distance below the first elevator car. By operating two elevators within a single shaft, more efficient use of the elevator shaft and, therefore, more passenger transportation is facilitated. As illustrated in FIG. 7, while passengers are being transported to the upper floors, the elevator shaft is simultaneously utilized for transporting our passengers to the parking area. This deployment scheme 700 increases the traffic flow significantly by allowing each of the twin elevator cars to operate in two separate regions 708, 710 that have little or no overlap within each shaft (e.g., shaft 702).

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. For example, the ordering of method steps is not necessarily fixed, but may be capable of being modified without departing from the scope and spirit of the present invention.

What is claimed is:

1. A method of operating an elevator system comprising a first and a second independently operable elevator car within each at least one elevator shaft within a building, the method comprising the steps of:
   a. assigning the first elevator to operate within a first region of the at least one elevator shaft;
   b. assigning the second elevator to operate within a second region of the at least one elevator shaft, wherein the second region is located above the first region;
   c. loading the first and the second elevator car from a ground floor level; and
   d. controlling the loading of the second elevator car from the ground floor by moving the first elevator below the level of the ground floor to a lower level zone.

2. The method according to claim 1, wherein the lower level zone comprises a virtual landing.

3. The method according to claim 1, wherein the lower level zone comprises at least one sub-ground level.

4. The method according to claim 3, wherein the at least one sub-ground level is a parking level.

\* \* \* \* \*